(12) United States Patent
Mueller

(10) Patent No.: US 6,809,795 B2
(45) Date of Patent: Oct. 26, 2004

(54) EXPOSURE DEVICE FOR EXPOSING A TRANSPARENT PHOTOGRAPHIC ORIGINAL

(75) Inventor: Peter Mueller, Mering (DE)

(73) Assignee: Agfa-Gevaert Aktiengesellschaft, Leverkusen (JP)

( * ) Notice: Subject to any disclaimer, the term of this patent is extended or adjusted under 35 U.S.C. 154(b) by 12 days.

(21) Appl. No.: 10/363,728

(22) PCT Filed: Sep. 17, 2001

(86) PCT No.: PCT/EP01/10713
§ 371 (c)(1),
(2), (4) Date: Mar. 6, 2003

(87) PCT Pub. No.: WO02/25370
PCT Pub. Date: Mar. 28, 2002

(65) Prior Publication Data
US 2003/0184723 A1 Oct. 2, 2003

(30) Foreign Application Priority Data
Sep. 19, 2000 (DE) ........................ 100 46 353

(51) Int. Cl.[7] .......................... G03B 27/54; G03B 27/32
(52) U.S. Cl. .......................................... 355/37; 355/32
(58) Field of Search .............................. 355/35, 37, 70, 355/71, 77, 32, 69

(56) References Cited

U.S. PATENT DOCUMENTS

| | | | |
|---|---|---|---|
| 3,782,821 A | | 1/1974 | Bosman |
| 4,099,864 A | * | 7/1978 | Gilligan et al. ................ 355/37 |
| 4,229,097 A | | 10/1980 | Vulmiere et al. |
| 4,371,258 A | * | 2/1983 | Mast ............................ 355/37 |
| 5,122,831 A | | 6/1992 | Suzuki |
| 5,255,171 A | | 10/1993 | Clark |
| 5,515,136 A | | 5/1996 | Nishio et al. |
| 5,969,372 A | * | 10/1999 | Stavely et al. .......... 250/559.42 |
| 6,149,283 A | * | 11/2000 | Conway et al. .............. 362/236 |

FOREIGN PATENT DOCUMENTS

| | | |
|---|---|---|
| DE | 100 41 750 | 3/2002 |
| EP | 0 281 056 | 9/1988 |
| EP | 0 691 568 | 1/1996 |
| JP | 10200697 | 7/1998 |
| JP | 11282092 | 10/1999 |

* cited by examiner

Primary Examiner—Alan Mathews
(74) Attorney, Agent, or Firm—Milde & Hoffberg, LLP

(57) ABSTRACT

The invention relates to an exposure device for exposing a transparent photographic original and reproducing said photographic original (2) on photosensitive material or by means of a recording device. The exposure device has a primary light source (1) comprising a number of elements that emit light of different spectral bands, whose light travels to the photographic original along a first optical path or can be directed onto the photographic original using optical elements. The exposure device has additional real and/or virtual light sources, (15, 16, 17, 18, 22, 24, 26, 28,) whose light strikes the photographic original along additional optical paths, or can be directed onto the photographic original using optical elements. The light that falls along the additional optical paths strikes the photographic original (2) at different angles of incidence from the angle of incidence of the first optical path.

22 Claims, 2 Drawing Sheets

EXPOSURE DEVICE FOR EXPOSING A TRANSPARENT PHOTOGRAPHIC ORIGINAL

BACKGROUND OF THE INVENTION

The present invention relates to a device for exposing a transparent photographic original so as to project a photographic image onto a light sensitive medium or onto a recording device which converts the image into electrical signals.

Such an exposure device is known, for example, from the European Patent no. EP 0 691 568. This patent describes a matrix composed of red, green, and blue LED elements that is used to expose photographic film to project the image onto photographic paper or onto a plane-surface sensor. As is usual with conventional light sources that expose and project transparent originals, the light of an LED matrix is scattered by a scatter plate in various directions. The scatter plate causes the light to be softer, so that scratches or other defects present in the photographic original are not reproduced, or are reproduced at a reduced level.

A disadvantage of such a scatter plate, positioned after the exposure device, is that it scatters a large portion of the light emitted from the LED away from the image, thus enormously reducing the efficiency of the light source, so that the exposure time for the projection is greatly increased. that the exposure time for the projection is greatly increased.

The German Patent Application No. DE 100 41 750 (not yet published) also describes an exposure device in which images to be scanned are illuminated using LED matrices. Each LED matrix includes LED's of different colors, and the light from several matrices is combined via a beam splitter into an illumination beam path to create the image of the photographic original.

This scanner contains no scatter medium to convert the light into soft light, so that defects present in the photographic original are reproduced without limitation in the recorded image data. Therefore, the patent document claims a correction process to correct these reproduced defects. Such defect-correction processes are very computer-time intensive, particularly if many defects are present, so that rapid processing of the recorded image signals is not possible using a defect-correcting scanner. photographing, processing, or image reproduction process are undesirable.

SUMMARY OF THE INVENTION

A principal objective of this invention is therefore to configure a scanner or printer in such a manner that the processing of the images to be reproduced may occur as quickly as possible without detraction from the image quality, particularly detraction caused by the reproduction of defects. This should be realizable with relatively low cost.

This objective, as well as other objectives which will become apparent from the discussions that follow, are achieved, in accordance with the present invention, by providing an exposure device which comprises:

(a) a primary light source with a number of elements emitting light of different bands of the spectrum, the light from the primary light source traveling to the photographic original along a first optical path, and striking the photographic original at a first incident angle; and (b) at least one additional light source whose light travels to the photographic original along at least one additional optical path, wherein the light traveling along the additional optical path strikes the photographic original at a different incident angle from the first incident angle of the first optical path.

According to the invention, a transparent photographic original is illuminated from several directions for the purpose of projection whereby the light strikes the image along differing optical paths. Each point of the photographic original is struck by light arriving at different incident angles. The light arriving at different incident angles can be combined onto the photographic original, but it is more advantageous for quick processing for the photographic original to be illuminated simultaneously from different directions.

The light emitted from the primary light source serves to project the image content of the photographic original onto light-sensitive material or an electronic receptor device. For the projection of transparent color photographic originals, light emitters emitting light in different bands of the spectrum are provided. The light emitted from them strikes either directly along the first optical path onto the photographic original, or is directed onto the photographic original by means of illumination optics consisting of additional optical elements, such as condenser lenses or mirrors.

Based on the invention, other light sources are provided, in addition to this primary light source, that serve to illuminate the photographic original. The additional light sources may be actual light sources, or actual light-emitting sources, or the additional light sources may be virtual light sources. Virtual light sources may include mirrors or beam splitters that reflect the light of an actual light source. The light from additional actual and/or virtual light sources strikes at an incident angle differing from that of the primary light source onto the photographic original. It is particularly advantageous if several additional actual and/or virtual light sources are provided whose light strikes the photographic original at several different incident angles.

The light from the primary light source projects the image information located on the photographic original onto light-sensitive material or onto a recording device. If, however, defects such as scratches or dust are present on the photographic original, the light from this light source is diffracted, scattered, or reflected. The diverted light no longer strikes the entry pupil of the projecting optics, and cannot reach the light-sensitive material or recording device. Thus, the light from the primary light source which strikes the defects in the photographic original is not projected, or is only partially projected, onto the light-sensitive material or recording device, and the image information is only incompletely reproduced. Areas with dark defects or incomplete image information corresponding to the defects are the result in the projected image. strikes the defects in the photographic original is not projected, or is only partially projected, onto the light-sensitive material or recording device, and the image information is only incompletely reproduced. Areas with dark defects or incomplete image information corresponding to the defects are the result in the projected image.

In contrast, the light from additional actual and/or virtual light sources strikes the photographic original at an incident angle different from that of the primary light source, and, after straight-line penetration of the photographic original, does not strike the entry pupil of the projecting optics. No image information from the additional actual and/or virtual light sources is projected onto the light-sensitive material or recording device unless this light is deflected in some manner. This is exactly what happens at the sites of defects. At the defective sites of the photographic original at which the light from the primary light source is deflected away from the entry pupil, the light striking the entry pupil of the projecting optics at a different incident angle is split, scattered, or reflected. Thus, the light from an additional actual and/or virtual light source that illuminated the photographic original at suitable incident angles passes through the recording optics and thus onto the light-sensitive material or correspondingly onto the recording device, thus transferring the image information present at the defect site. The image information from the primary light source missing in the reproduction is replaced by image information projected from the additional actual and/or virtual light sources. Thus, defective sites in the photographic original may be so illuminated that they are not visible in the recording, or at least have reduced effect. Since defects occur in different forms and orientations, various incident angles are required to reduce their effects by means of light entering the entry pupil after diffraction, scattering, and/or reflection. In order, therefore, not to reproduce all, or as many as possible, defects in the projection, it is necessary that light strike the photographic original from as many different incident angles as possible. Therefore, several additional actual and/or virtual light sources are provided that illuminate the photographic original at various incident angles. Since the defect sites may extend in various directions on the photographic original, and since the deflection of incident light as a rule is only effective if perpendicular to the orientation direction of the defect, it is advantageous to position additional actual and/or virtual light sources distributed spatially around the primary light source. In order to reduce or correct as many defect sites in the reproduction as possible, it would be ideal to configure a Lambert beam using additional light sources. The number of light sources required for this does not represent unmanageable expense or unreasonable cost.

It has been shown that defects are essentially caused by scratches to the photographic original or dust particles lying on the photographic original. Also, scratches, particularly to photographic film, generally occur along one direction, the so-called film travel direction. Most defects caused by these scratches are reduced in that light from additional actual and/or virtual light sources strikes the photographic original at an incident angle not much different from that of the primary light source. In an advantageous embodiment of the exposure device, additional actual and/or virtual light sources are so positioned that light emitted from them along the optical axis does not pass directly through the entry pupil of the projecting optics, and the incident angle of this light onto the photographic original deviates a small amount from the incident angle of the primary light source. Thus, the incident angle of additional actual and/or virtual light sources is naturally dependent on entry pupil and positioning of the projecting optics. The additional light sources are preferably so positioned that their light strikes the photographic original at an incident angle of less than 40° to the incident angle of the primary light source. If, for example, the light from the primary light source strikes the photographic original at the perpendicular, then the incident angle of additional actual and/or virtual light sources will advantageously lie between 55° and 75°, i.e., about 65°. Error sites caused by scratches in the photographic original of the photograph are reduced the most efficiently by means of additional actual and/or virtual light sources so positioned.

The additional actual and/or virtual light sources should preferably be positioned on both sides of the primary light source, or around it spatially, so that reduction in the defect sites is symmetrical. The additional actual and/or virtual light sources are preferably positioned perpendicular to the travel direction of the scratches in the photographic original. For photographic film, this travel direction as a rule is the same as the film travel direction in which the film is moved through a processing machine or contact-sheet printer.

In contrast, error sites in the image caused by dust or other contaminating particles on the photographic original or on the supporting surface of the photographic original, are reduced most efficiently by having the light from additional actual and/or virtual light sources strike the photographic original at a very flat incident angle. Thus, the light partially strikes the underside of the dust particle, is reflected by it, and passes into the entry pupil of the projecting optics, while the light from the primary light source is absorbed by or reflected back by the dust particle. Therefore, the actual and/or virtual light sources are advantageously so positioned that their light strikes the photographic original at an incident angle <50°. The selected incident angle is preferably between 45° and 25°, as limited by design considerations.

It is thus not necessary to create a complete Lambert beam characteristic by means of actual and/or virtual light sources. For reduction of defect sites in the projection caused by defect sites or particles on the photographic original, it is sufficient to position actual and/or virtual light sources in selectively-determined light incidence angles. In an advantageous embodiment, additional actual and/or virtual light sources are positioned at an angle only slightly deviating from that of the original, and also additional light sources arranged with a very flat Incidence angle to the photographic original. Additional actual and/or virtual light sources that are positioned at different angles might reduce the defect sites, but their efficiency is so low that the cost is not justified by the improvement to the image.

Since the light from additional actual and/or virtual light sources reaches the entry pupil of the projecting optics only indirectly, i.e., via diffraction, scattering, or reflection, the intensity of the light projected from these light sources onto the recording device is very low. Therefore, relatively long exposure times are necessary in order to completely reproduce the image information lost because of the defect sites. Long exposure times, however, are very undesirable with high-output printers or scanners. It is therefore particularly advantageous to make the use of additional actual and/or virtual light sources dependent on the condition of the photographic original, or on the number and properties of the defect sites on the photographic original. If, for example, a seriously-scratched photographic original must be used, it is worthwhile, to illuminate using the light from additional actual and/or virtual light sources positioned near the primary light source. If, on the other hand, the photographic original is very dirty, it is preferable to illuminate using light sources at a flat angle. A photographic original influenced very little by defects may also be advantageously illuminated without the additional actual and/or virtual light sources. For this reason, it is very advantageous for the additional actual and/or virtual light sources to be switchable depending on the condition of the photographic original.

The condition of the photographic original may be evaluated as, for example, a lightly-scratched first copy of a photographic film, or perhaps a subsequent order from a defective original. It is also possible using a so-called pre-scan to sample the photographic original in order to establish whether the photographic original is seriously influenced by defects or not. The pre-scan may be performed, for example, using a coarse infrared scan. For this, it is sufficient to illuminate the photographic original with very oblique infrared light which does not normally enter the entry pupil of the projecting optics, and to measure which portion of the infrared radiation diffracted or scattered at the defect site reaches the recording device. Based on this pre-scan, a subsequent scan or illumination of the photographic original may be performed using only the light from the primary light source, or with only the light from the primary and selected additional actual and/or virtual light sources.

The primary light source of the exposure device preferably includes multi-colored LED's. These LED's include the red, green, and blue bands of the spectrum for the scanning or copying of transparent color photographic originals. If a procedure is to be used to correct remaining defect sites, it is advantageous to provide infrared LED's. These LED's may be mixed in a matrix-like array. It is also advantageous to position LED's from different bands of the spectrum, or for a portion of the band of the spectrum, in one array and others in a second array. The light from the different arrays may be combined, for example, via a beam splitter into a single beam path. It is also possible to mix the light from different LED matrices in a light mixer and subsequently to direct it into one beam path onto the photographic original. In principle, all light sources suitable for the illumination of transparent color photographic originals independent of their structure are conceivable and suitable.

Additional actual light sources will preferably include rapidly-switchable color light emitters such as LED's. It is desirable that the spectral band of these additional actual light sources to coincide with that of the spectral band covered by the primary light source. The infrared band of the spectrum, which is used merely for scratch correction, need not be covered by the additional actual light sources. If this is not the case, the difference in the exposure time selected for the additional actual light sources must be calculated based on the sensitivity of the recording device.

The additional actual and/or virtual light sources are so structured that the light emitted from them strikes the photographic original at an angle deviating slightly from the incident angle of the primary light source. As a rule, an angle of 90° is selected for standard illumination of the photographic original. Therefore, the additional actual and/or virtual light sources are so positioned that the incident angle of their light is less than 90°.

Several additional actual and/or virtual light sources are preferably provided that illuminate the photographic original from different angles.

In a particularly advantageous arrangement, the light sources are so structured or so positioned that their optical axis does not pass through the entry pupil of the projecting optics. The straight-line light emitted from the additional actual and/or virtual light sources is thus not projected by the projecting optics onto the recording device or light-sensitive material. Only if the light from additional actual and/or virtual light sources strikes a defect site in the photographic original can it be so deflected that it passes through the entry pupil of the projecting optics.

In order to ensure that the reduction in defect sites in the image data caused by defects is uniform in all regions of the image, it is advantageous to configure and position the additional actual and/or virtual light sources so that they illuminate the photographic original uniformly, i.e., the additional actual and/or virtual light sources should preferably be projected overall onto each point of the photographic original with the same intensity for each color. Each point of the photographic original should be illuminated in all colors at the same intensity.

Semi-conductor diodes or other light-emitting rapidly-switchable emitters may be used as primary or additional actual light sources instead of LED's.

In order to avoid additional actual light sources, it is advantageous to use mirrors instead of additional actual light sources, so that virtual light sources are created that shine the light from the primary light source at an additional incident angle onto the photographic original. This is of particular advantage if color-neutral mirror surfaces are used. If laterally-radiated light from the primary light source is used for additional illumination, the fact that the band of the spectrum of the additional light sources does not coincide with the bands of the spectrum from the primary light source may be disregarded. Because of the color neutrality of the mirror, coincidence of the band of the spectrum of the additional virtual light sources with the bands of the spectrum from the primary light source is ensured.

The above-mentioned use of light derived laterally from the primary light source to control the virtual light sources that would otherwise be lost further results in energy savings and in reduced heating of the lamp housing. Additional cooling measures or large-volume lamp housings are not required.

In order to achieve uniform improvement of projection quality, the mirror surfaces are preferably arranged in a ring about the optical axis of the projecting optics of the photographic original.

An embodiment especially preferred is one where the mirror surfaces are so structured and positioned that the optical axis of the light from the primary light source reflected from them does not pass through the entry pupil of the optics forming the photographic original Instead of a mirror, beam splitters or other optical elements are conceivable. Important is only the fact that virtual light sources are created which fulfill advantageous conditions for the additional light sources.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
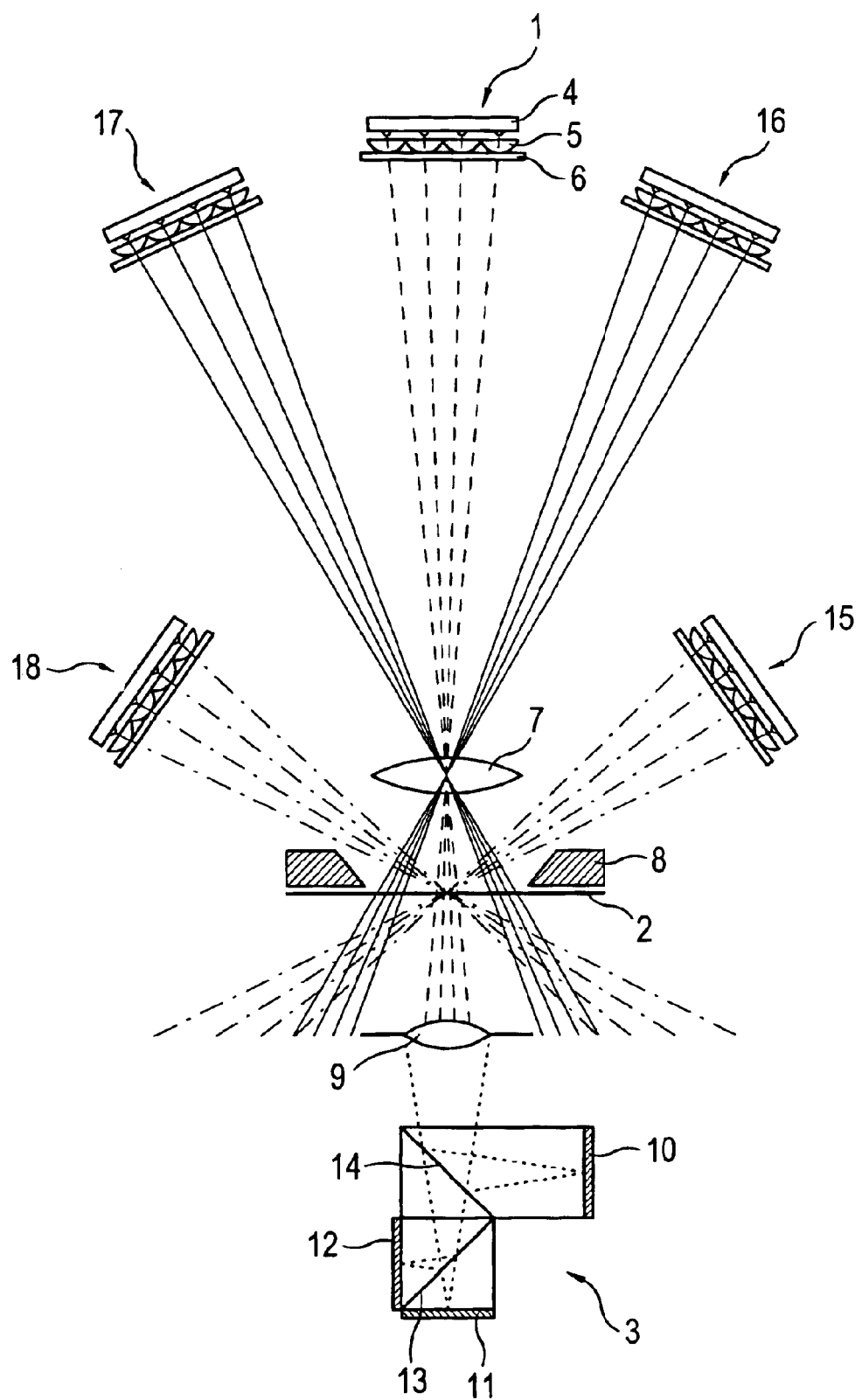
FIG. 1 is a schematic representation of a first embodiment of a scanner with an illumination device based on the invention.

The preferred embodiment of the present invention will now be described with reference to FIGS. 1–2 of the drawings. Identical elements in the two figures are designated with the same reference numerals.

FIG. 1 shows a scanner to project transparent photographic originals onto a recording device with additional actual light sources. An exposure device 1 illuminates the transparent photographic originals 2, i.e., a photographic film, in order to project it onto the recording device 3. The exposure device 1 includes a LED array 4 in which LED's of different colors are mixed in a matrix. Red, green, and blue LED's are preferably included. If a scratch correction via infrared light is to be performed, additional infrared LED's are provided. A lens array 5 is positioned in front of The recording device 3 includes three CCD chips 10, 11, and 12 that convert the three spectral portions of the light into electrical image signals. These spectral portions are separated from the overall projection beam path via beam splitters 13 and 14. If an additional scan in infrared light is planned, it is worthwhile to provide an additional CCD chip by means of which the infrared light is also separated from the common beam path.

According on the invention, additional light sources 15, 16, 17 and 18 are provided to project the image whose emitted light strikes the photographic original along an optical path different from that of the primary light source. The light sources 16 and 17 are so positioned that their light strikes the photographic original at an angle of about 65°. An incident angle of about 35° is selected for the light sources 15 and 18. An incident angle of about 35° is selected for the light sources 15 and 18. The other light sources are structured exactly as the primary light source 1. Many worthwhile configurations are conceivable, however.

Important is only that the spectral colors emitted from the additional actual light sources coincide with those from the The recording device 3 includes three CCD chips 10, 11, and 12 that convert the three spectral portions of the light into electrical image signals. These spectral portions are separated from the overall projection beam path via beam splitters 13 and 14. If an additional scan in infrared light is planned, it is worthwhile to provide an additional CCD chip by means of which the infrared light is also separated from the common beam path.

According on the invention, additional light sources 15, 16, 17 and 18 are provided to project the image whose emitted light strikes the photographic original along an optical path different from that of the primary light source. The light sources 16 and 17 are so positioned that their light strikes the photographic original at an angle of about 65°. An incident angle of about 35° is selected for the light sources 15 and 18. An incident angle of about 35° is selected for the light sources 15 and 18. The other light sources are structured exactly as the primary light source 1. Many worthwhile configurations are conceivable, however.

Important is only that the spectral colors emitted from the additional actual light sources coincide with those from the primary light source. The additional actual light sources may be so positioned that their light also passes through the condenser lens 7. They may, however, be so positioned that their light passes between the condenser lens and the film stage, and strikes directly onto the image. It is also possible to omit the condenser lens 7 completely. In this case, the light yield of the scanner is reduced.

Use of additional actual light sources ensures that each point of the photographic original is illuminated from different light sources at different angles. While the light from the light source 1 strikes the photographic perpendicularly, passes through it, and ends up directly on the recording device 13 via the entry pupil of the projecting optics 9, the light emitted from the additional actual light sources 15, 16, 17 and 18 misses the entry pupil of the projecting optics 9 after illuminating the photographic original. The light from additional actual light sources does not strike the entry pupil of the projecting optics 9 without the photographic original, or without passing through regular image points of the photographic original, and thus does not reach the recording device 3 in a normal case.

There is thus no contribution to projection of the image located on the photographic original unless it strikes a defect site of the photographic original. At defect sites of the photographic original or dust particles on the photographic original that have the effect of absorbers or cylindrical lenses, the light from the light sources is diffracted, scattered, or reflected. This light deflection affects the light of the first exposure device 1 in that it does not reach, or only partially reaches, the entry pupil of the projecting optics 9. Only a little, or no, light strikes the recording device at the image point formed by a defect site, and no error site is reproduced in the image data.

The light from additional actual light sources that normally does not enter the entry pupil is deflected and scattered at defect sites or scratches, and is scattered and reflected from absorbers if it strikes them at the proper angle so that it enters the entry pupil and thus is projected onto the recording device. This light may replace the lost light from the primary light source 1, thus brightening defect sites in the image caused by defects. This makes it possible to reduce the number of defect sites caused by defects, and to obtain a defect-free image or an image with a reduced number of defects.

Figure 2:
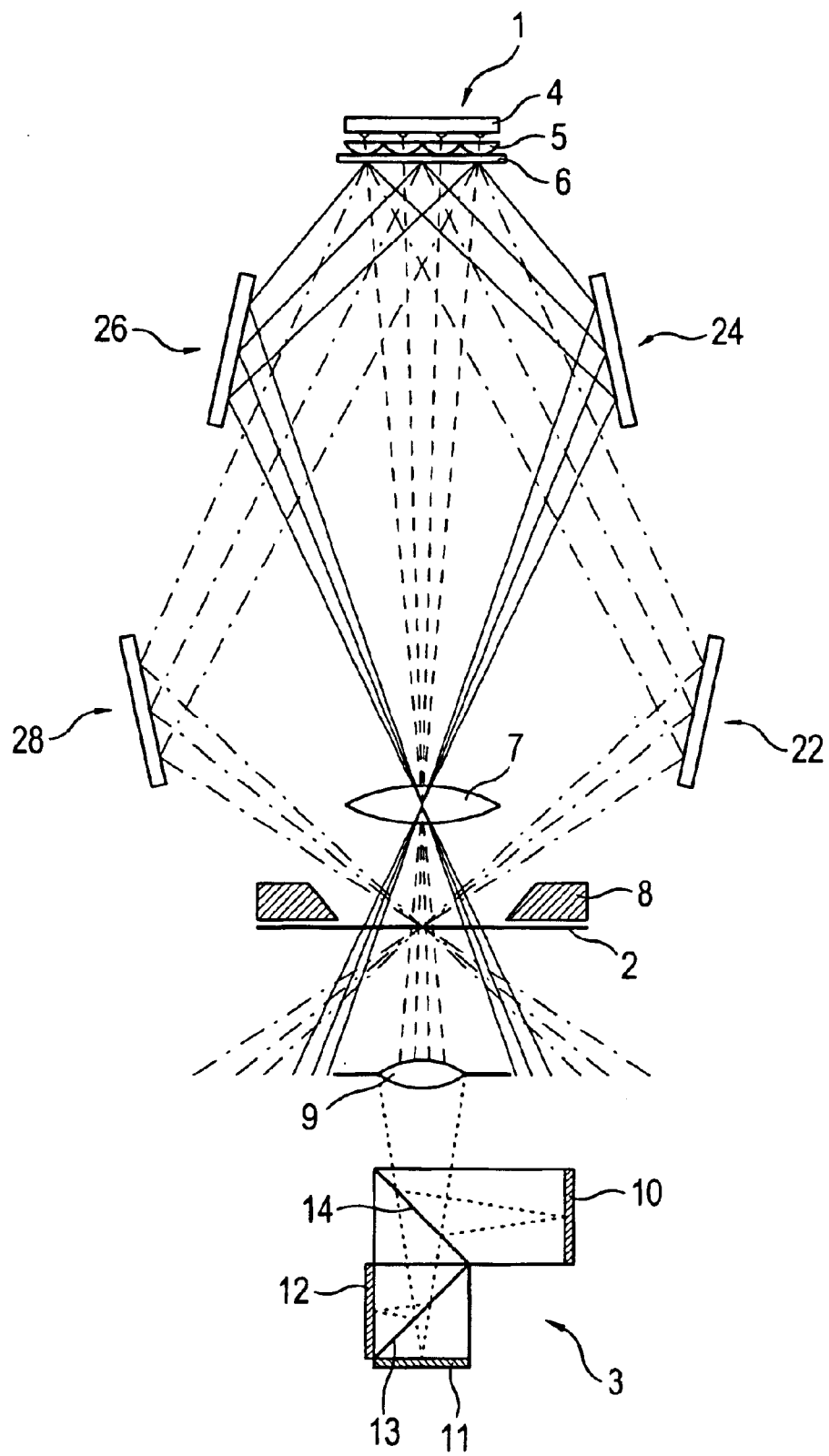
FIG. 2 is a schematic representation of a second embodiment of a scanner with an illumination device based on the invention.

FIG. 2 shows another embodiment example of a scanner used to project transparent photographic originals onto a recording device with additional virtual light sources. As in FIG. 1, an exposure device 1 illuminates the transparent photographic original 2 in order to project it onto the recording device 3. For this, the exposure device 1 consists of an LED array 4 in which various-colored LED's are positioned and mixed in a matrix, a lens array 5 that focuses the light primarily toward the photographic original 2, and a color filter 6. The light emitted from the exposure device 1 along the main illumination direction is projected onto the photographic original 2 located on the film stage 8 via a condenser lens 7. The exposure light passing through the photographic original 2 is subsequently projected onto the recording device 3. The recording device 3 includes three CCD chips 10, 11, and 12 that convert the three spectral components of the light into electrical image signals. The spectral components are separated from the common beam path via beam splitters 13 and 14. Likewise, additional LED's for infrared light as described for FIG. 1, or additional CD chips, may be provided in the scanner.

According to the invention, additional virtual light sources 22, 24, 26 and 28 are provided to expose the image. These virtual light sources include mirrors that reflect the laterally-radiated light from the LED arrays of the exposure unit 1 and which are not used by the embodiment example described in FIG. 1, so that light passes along additional optical paths onto the photographic original 2. The mirrors 24 and 26 are so positioned here that the light from the exposure source 1 reflected from them strikes the photographic original at an angle of about 65°. The mirrors 22 and 28 are so positioned that an incident angle of about 35° is achieved. The particular advantage in this configuration is the fact that the spectral colors coincide with those from the primary light source, since only the light from the exposure unit 1 is used. The virtual light sources 22, 24, 26, and 28 may thereby be so positioned that their light also passes through the condenser lens 7, such as for example the light reflected from the mirrors 24 and 26. They may also be so positioned that their light passes between the condenser lens 7 and the film stage 8, directly onto the photographic original 2, such as the light reflected from mirrors 22 and 28.

Using a scanner, as described for FIGS. 1 and 2, color photographs may be reproduced via illumination of the photographic original 2 from the light source 1 in all colors simultaneously. The additional actual and/or virtual light sources are switched on in order to reduce defect sites, so that they form a non-defective image signal at the defect sites.

There has thus been shown and described a novel exposure device for exposing a transparent photographic original which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An exposure device for exposing a transparent photographic original so as to project a photographic image onto light-sensitive material or onto a recording device for converting the image into electrical image signals, said exposure device comprising; in combination:
   (a) a primary light source with a number of elements emitting light of different bands of the spectrum, the light emitted from said primary light source traveling to the photographic original along a first optical path and striking the photographic original at a first incident angle; and
   (b) a plurality of additional light sources, the light emitted from each additional light source traveling to the photographic original along at least one additional optical path, wherein the light traveling along each additional optical path strikes the photographic original at a different incident angle from the first incident angle.

2. The exposure device according to claim 1, wherein at least one of the additional light sources includes a plurality of actual light sources.

3. The exposure device according to claim 1, wherein at least one of the additional light sources includes a plurality of virtual light sources.

4. The exposure device according to claim 1, wherein at least one of the additional light sources includes at least one actual light source and at least one virtual light source.

5. The exposure device according to claim 1, wherein the light emitted by the primary light source is directed onto the photographic original by means of optical elements.

6. The exposure device according to claim 1, wherein the incident angle of light from said additional light sources deviates from the first incident angle of light from said primary light source by less than 40°.

7. The exposure device according to claim 6, wherein the incident angles of light from said additional light sources deviates by an angle in the range of 15° to 35° from the first incident angle of light from said primary light source.

8. The exposure device according to claim 1, wherein the incident angles of light from the said additional light sources are less than 50°.

9. The exposure device according to claim 8, wherein the incident angles of light from said additional light sources are in the range of 45° and 25°.

10. The exposure device according to claim 1, wherein at least one of said primary and said additional light sources includes LEDs as light source elements.

11. The exposure device according to claim 10, wherein said primary light source includes LEDs as light source elements, said LEDs emitting light in differing bands of the spectrum and being arranged in an array.

12. The exposure device according to claim 10, wherein at least one of said additional light sources includes LEDs as light source elements, said LEDs emitting light in differing bands of the spectrum and being arranged in an array.

13. The exposure device according to claim 10, wherein the LEDs of said at least one primary light source and additional light sources emit light in differing bands of the spectrum and are arranged in a mixed configuration.

14. The exposure device according to claim 1, further comprising means for switching said additional light sources on and off individually.

15. The exposure device according to claim 3, wherein said virtual light sources are formed from the light emitted by said primary light source and reflected by mirror surfaces.

16. The exposure device according to claim 15, further comprising projection optics for projecting light onto light sensitive material or recording device, wherein the mirror surfaces extend in a ring around an optical axis of said projecting optics.

17. The exposure device according to claim 13, wherein the bands of the spectrum include red, green, blue and infrared.

18. The exposure device according to claim 15, the mirror surfaces are color-neutral.

19. The exposure device according to claim 1, further comprising projection optics for projecting light onto the light-sensitive material or recording device, said projection optics having an entry pupil, and wherein said additional light sources are so structured and positioned that optical axes of the light emitted from them do not pass through said entry pupil.

20. The exposure device according to claim 15, further comprising projection optics for projecting light onto the light sensitive material or recording device, said projection optics having an entry pupil, and wherein the mirror surfaces are so structured and positioned that an optical axis of the light reflected from them does not pass through said entry pupil.

21. The exposure device according to claim 1, wherein the additional light sources are so structured and positioned that the light emitted from them illuminates the photographic original uniformly in every band of the spectrum.

22. The exposure device according to claim 1, wherein the additional light sources are so structured and positioned that the light emitted from them strikes every point of the photographic original from several directions.

* * * * *